United States Patent [19]

Moisin

[11] Patent Number: 4,864,609
[45] Date of Patent: Sep. 5, 1989

[54] TELEPHONE LINE INTERFACE CIRCUIT

[75] Inventor: Mihail S. Moisin, Ontario, Canada

[73] Assignee: Northern Telecom Limited, Montreal, Canada

[21] Appl. No.: 199,745

[22] Filed: May 26, 1988

[51] Int. Cl.$^4$ ............................................. H04M 19/00
[52] U.S. Cl. ...................................... 379/413; 379/399
[58] Field of Search ................ 323/355, 356; 379/413, 379/412, 402, 398, 399, 338

[56] References Cited

U.S. PATENT DOCUMENTS 4,607,142  8/1986  Martin .............................. 323/356 X

FOREIGN PATENT DOCUMENTS 0167564  8/1985  Japan ..................................... 379/412

*Primary Examiner*—Jin F. Ng
*Assistant Examiner*—Randall S. Vaas
*Attorney, Agent, or Firm*—J. E. Moorhouse

[57] ABSTRACT

A telephone line circuit transformer couples tip and ring leads of a telephone line to a telephone facility. Tip and ring transformer windings are connected in series with the respective tip and ring leads, tip and rings feed resistors and terminals of a battery power source for supplying energizing current to the telephone line. A capacitor is connected between a junction of the tip winding and the tip feed resistor and a junction of the ring winding and the ring feed resistor. A compensating circuit is connected to drive a compensating winding in current opposing relationship with respect to differential alternating current signals in the tip and ring windings and being within a range of voice frequencies within which an impedance of the capacitor is significantly shunted by the feed resistors.

6 Claims, 3 Drawing Sheets

TELEPHONE LINE INTERFACE CIRCUIT

INTRODUCTION

The invention is in the field of line interface circuits and is particularly concerned with a transformer coupling a telephone line with a telephone facility.

BACKGROUND

Telephone line interface circuits, similar to that disclosed by V. V. Korsky in U.S. Pat. No. 4,103,112 titled "Telephone Line Circuit With Differential Loop Current Sensing and Compensation" have been widely used in combination with telephone switching facilities manufactured by the assignee. One problem with this circuit is that its return loss characteristic in a portion of the voice band is at variance with a return loss specification of a telephony standards setting organization known as the Local Area Telecommunications Authority Switching Systems General Requirements (LSSGR). The standard is simply defined in terms of passive electrical components. Particularly, the ac terminating characteristics of a line interface circuit, being connected to terminate a telephone line, are to be that of a 900 ohm resistor connected in series with a 2.16 micro farad capacitor. The characteristic determining structure in the line circuit as described in the previously mentioned patent is that of tip and ring transformer windings being connected in series with a direct current blocking capacitor, across the telephone line. The capacitive requirement is provided by the value of the capacitor and the resistance requirement is provided by a resistive termination of a secondary winding in the transformer.

This structure would be perfectly satisfactory if it were not for the presence of tip and ring feed resistors which function to provide a path for direct energizing current flow for operation of the telephone line. The tip and ring feed resistors are usually of a sum total resistance of about 400 ohms, but can be of greater of lesser value. This 400 ohm value strikes a compromise between reasonable length of serviceable telephone line and maximum line current in a short line. As is well known, the impedance of any capacitive element varies inversely with frequency. In the case of the line circuit, voice frequency signals of less than about 500 Hz are effectively split between two significantly conductive paths, one being the intended path provided by the capacitor and the other being the unintended path of the tip and ring feed resistors in series with the battery source.

SUMMARY OF THE INVENTION

It is an object of the invention to provide a resistive feed transformer coupled telephone line interface circuit with an improved terminating impedance characteristic.

In accordance with the invention, a telephone line interface circuit for coupling tip and ring leads of a telephone line with a telephone facility includes, tip and ring terminals for connection to the tip and ring leads, and a transformer having tip and ring windings each being connected in series with a respective one of the tip and ring terminals. The transformer also includes a compensating winding. Tip and ring feed resistors are connected in series with the respective tip and ring windings for supplying the telephone line with energizing current from a power source. A capacitor is connected between respective junctions of the tip and ring feed resistors and the tip and ring windings. A compensating means drives the compensating winding in current opposing relationship with respect to differential alternating current signals in the tip and ring windings and being limited to a range of voice frequencies within which an impedance of the capacitor is significantly shunted by the resistance of said feed resistors.

A method, of interfacing a telephone line with a telephone facility, in accordance with the invention, includes, impeding a battery source of current flow to and from tip and ring leads of the telephone line via tip and ring windings of a transformer and corresponding tip and ring feed resistances being of similar predetermined values. Alternating current is coupled between the tip and ring windings via a capacitance of predetermined value being connected therebetween. Alternating current is driven via another winding of the transformer in current opposing relationship with differential alternating currents in the telephone line, and being in a range of voice frequencies at which impedance of the capacitance is significantly shunted by the tip and ring feed resistors and the battery source, whereby the sum alternating currents in the capacitor 6 and the resistors 12 and 13 is substantially reduced to that which would normally be conducted by the capacitor 6, were the feed resistances not present.

BRIEF DESCRIPTION OF THE DRAWINGS

An example of a telephone line interface circuit is discussed with reference to the accompanying drawings in which:

In FIG. 1, tip and ring terminals 2 and 3 are provided for connection of tip and ring leads of a telephone line, or the like, not shown. The tip and ring terminals 2 and 3 are coupled to battery terminals, indicated at $-V$ and ground, via tip and ring feed resistors 12 and 13 being connected in series with and tip and ring primary windings 4 and 5. The tip and ring primary windings 4 and 5 are part of a line circuit transformer 10 which also includes a secondary winding 7 and a compensating winding 28. The secondary winding 7 terminates at a 2 wire/4 wire electronic hybrid circuit 8. It is also typical practice to couple a protection network across the secondary winding 7 so that a short circuit path is provided for transient current pulses as might be introduced onto the telephone line as a result of a lightening strike or from an errant power line cross. In similar manner, a protection device or network 29 is connected across the compensating winding 28. Differential voice band signals are inductively coupled between the primary, secondary and compensating windings. Alternating currents are conducted via the tip and ring windings 4 and 5 and a capacitor 6. A characteristic impedance of the line interface circuit is determined by a terminating resistance element, not shown, in the electronic hybrid circuit 8 which is effectively in series with the capacitor 6. The capacitor 6 is intended to be the only conduction path of significance for alternating currents in the voice band. However, the presence of the tip and ring feed resistors provide a disruptive effect. At lower voice band frequencies, of for example 500 hz and less, and with feed resistances of about 200 ohms, the feed resistors 12 and 13 conduct a significant amount of differential voice band current, thereby materially decreasing the preferred characteristic impedance of the line circuit at the lower voice band frequencies. Consequently, hybrid performances of the electronic hybrid circuit 8 is of lesser effect than desired. However, this disadvantage has, in the past, been compensated by an expedient compromise, namely that of building in a fixed amount of subscriber loop attenuation in the hybrid circuit 8.

It has been found that this compromise of introducing otherwise undesirable attenuation can be avoided by providing an active compensation circuit, within the telephone line interface circuit. In FIG. 1, tip and ring voltage dividers 14 and 15 including resistors 14a, 14b, 15a and 15b, being connected as shown, define tip and ring taps 16 and 17. A compensation circuit at 20 includes a differential amplifier 21 connected in combination with resistors 22, 23, 24 and 26 and capacitors 25 and 27 to drive the compensating winding 28. In a case wherein the tip and ring primary winding inductance of the transformer 10 is about 1.7 H, a typical value and the turns ratio between primary winding and secondary compensating winding is about 1:5. Resistance and capacitance values of circuit components as listed in the following table have been shown to provide substantially improved operating results.

Figure 1:
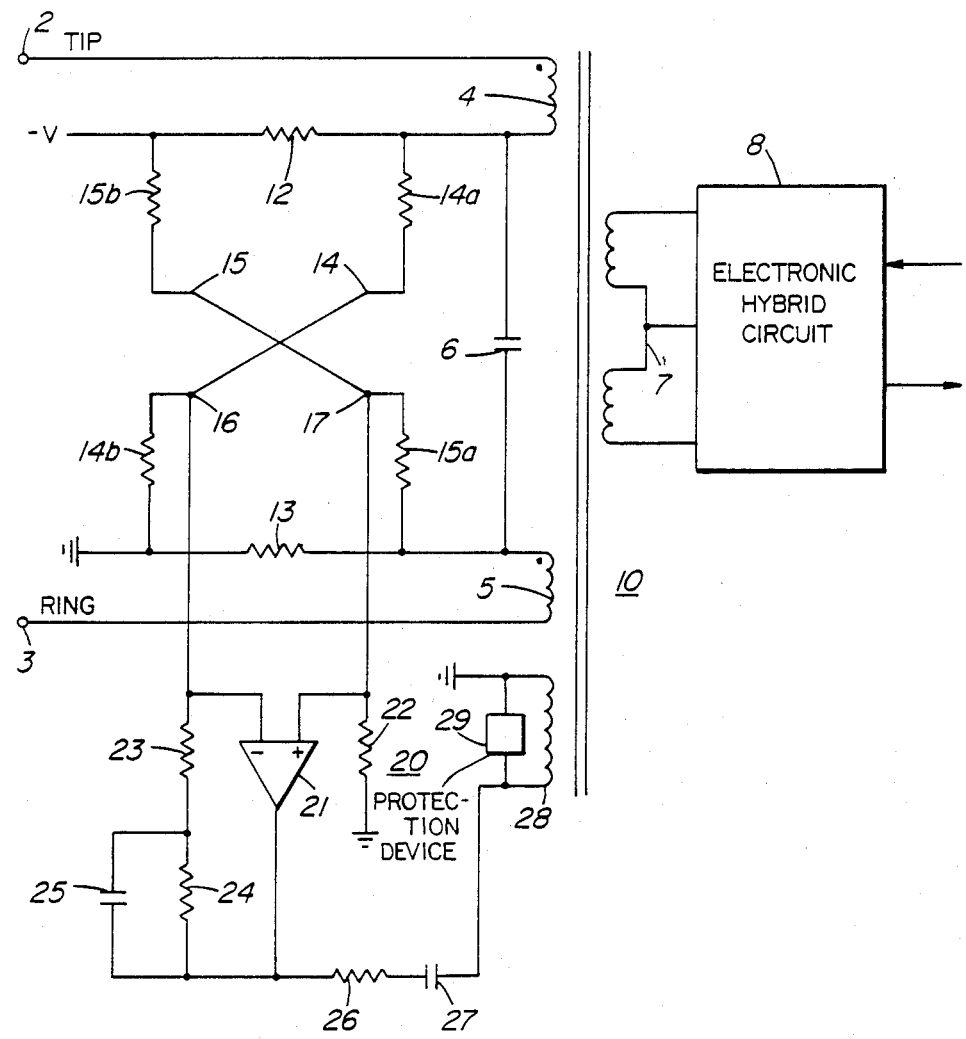
FIG. 1 is a schematic drawing of a line interface circuit with alternating current compensation, in accordance with the invention.

| Component | Value |
| --- | --- |
| resistors 12, 13 | 200 Ohms |
| resistors 14a, 14b, 15a, 15b | 300 Kohms |
| resistors 18a, 18b | 150 Kohms |
| resistor 22b, 23 | 51 Kohms |
| resistor 24 | 200 Kohms |
| resistor 26, 39 | 10 Kohms |
| resistor 35 | 1 Kohm |
| capacitor 6, 27 | 1 micro farad |
| capacitor 25 | 10 micro farads |

Figure 2:
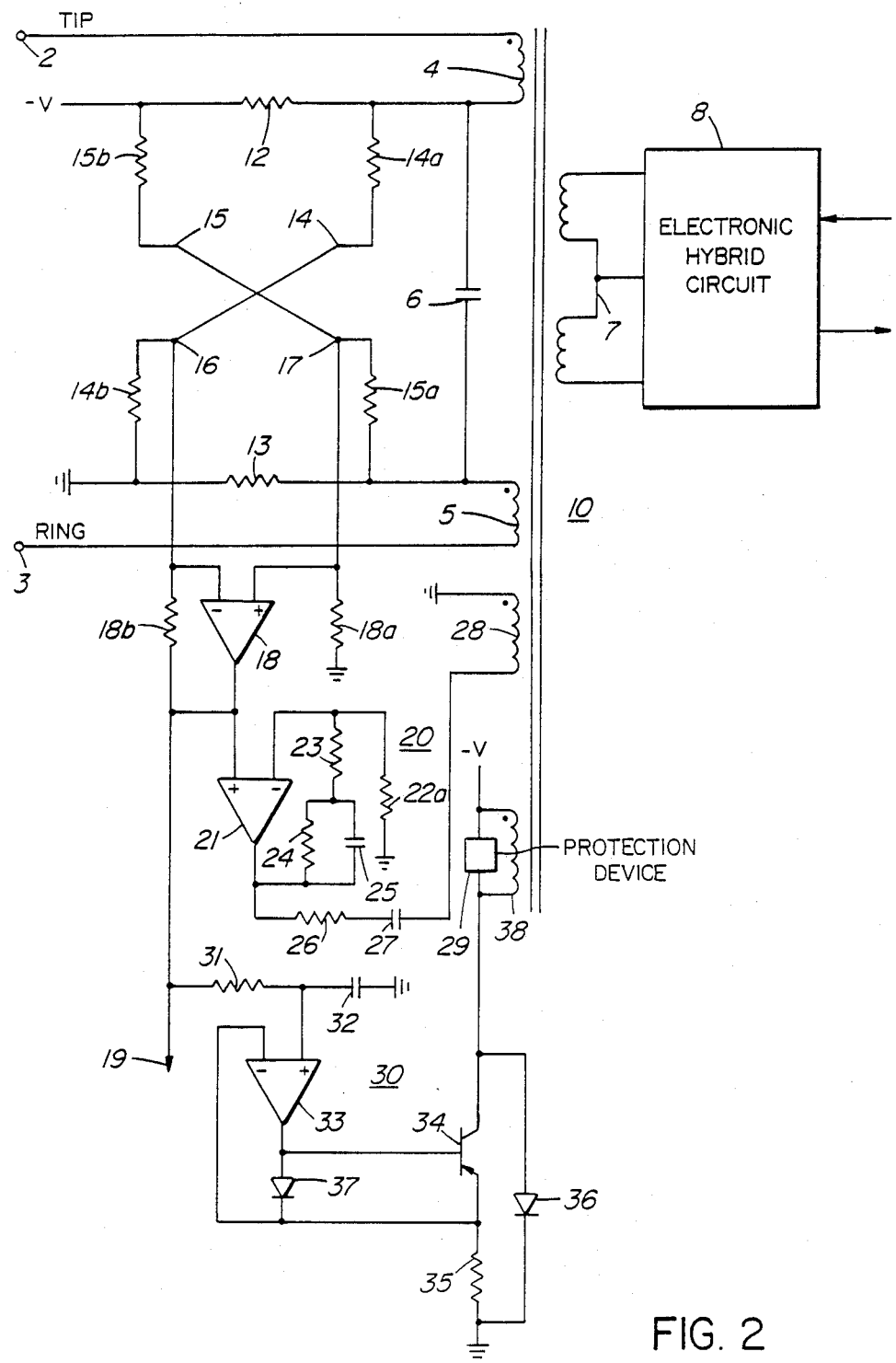
FIG. 2 is a schematic diagram of direct current and alternating current compensating circuits useful in FIG. 1.

In FIG. 2, a direct current compensation circuit substantially as taught in the previously mentioned patent to V. V. Korsky is provided by additional components 18, 18a, 18b, 29 and 31 through 38. The amplifier 18 is connected to be responsive to currents in the tip and ring feed resistor as represented by voltages at the tip and ring taps 16 and 17. An output 19 of the amplifier 18 is used for purposes of signalling and supervision, and as a drive for the amplifier 33 via a low pass network having with a roll off point of about 3 Hz being determined by the values of components 31 and 32. As described by Korsky, the compensating winding 38 is driven by an emitter follower arrangement of the transistor 34 in response to the output of the amplifier 33, in order to reduce direct current flux in a core of the transformer 1, ideally to nil. Alternating current compensation is also provided as described in relation to FIG. 1, such that ac potentials appearing across the tip and ring terminals are boosted in the lower voice band frequencies to be substantially as these would be if the tip and ring feed resistors were also of nearly infinite inductance. In this example a resistor 22a is of about 100 Kohms.

Figure 3:
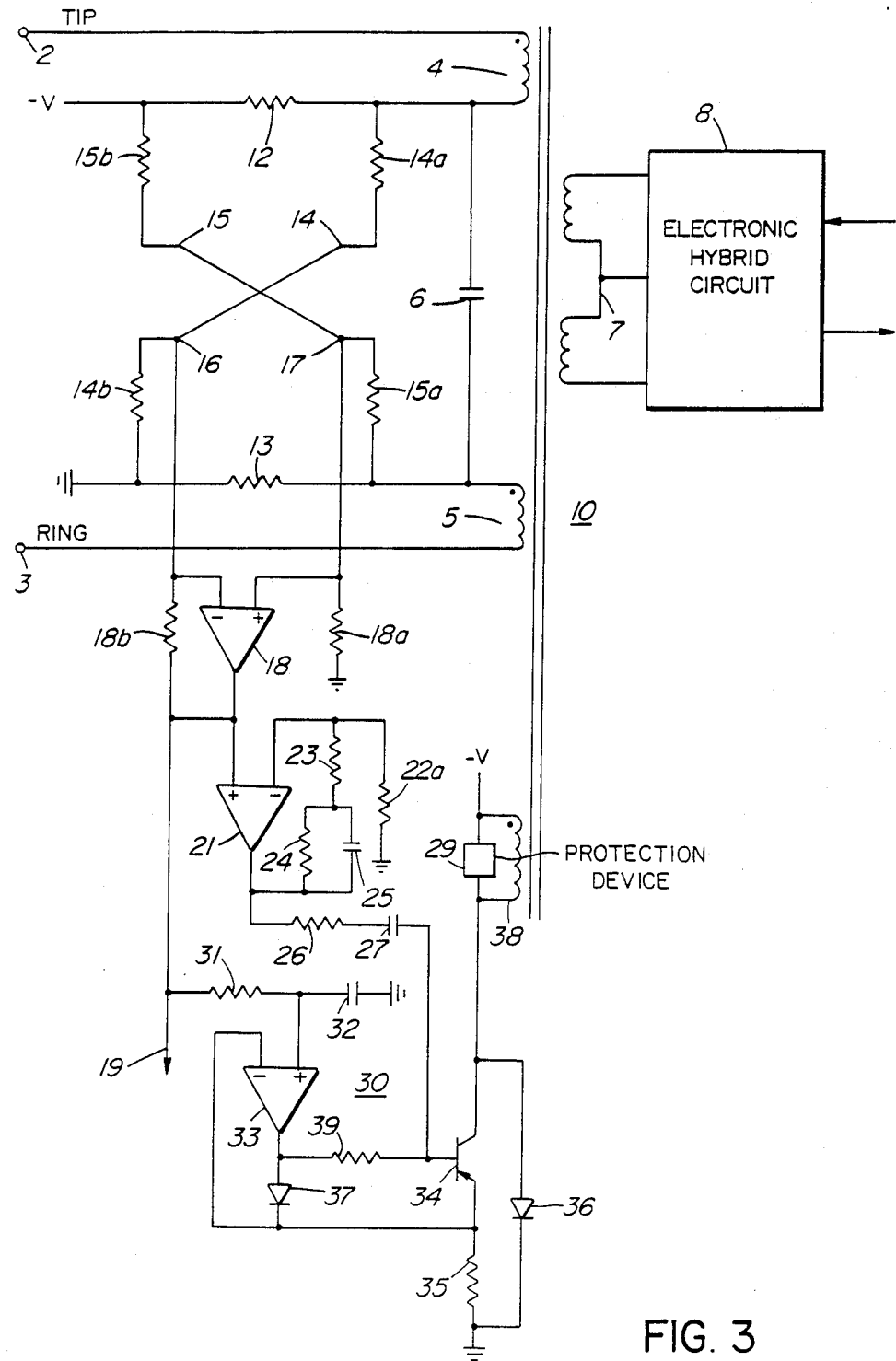
FIG. 3 is a schematic diagram of a combined direct and alternating current compensating circuit useful in FIG. 1.

In FIG. 3, an example is illustrated wherein the advantages of direct current compensation and alternating current compensation are combined via a single compensating winding 38.

In this example, the output of the amplifier 21 is RC coupled to a junction of the emitter electrode of the transistor 34 and a resister 39.

I claim:

1. A telephone line interface circuit for coupling tip and ring leads of a telephone line with a telephone facility, comprising:

tip and ring terminals for connection to the tip and ring leads;

a transformer having tip and ring primary windings each being connected in series with a respective one of the tip and ring terminals, a secondary winding for transmitting signals to and receiving signals from the telephone facility, and a compensating winding;

tip and ring feed resistors being connected in series with the respective tip and ring primary windings, for supplying the telephone line with energizing current from a power source via the tip and ring primary windings and the tip and ring terminals;

a capacitor being connected between respective junctions of the primary windings and the feed resistors; and compensating means for driving the compensating winding in current opposing relationship with differential alternating current signals in the tip and ring primary windings, said differential alternating current signals being limited to a range of voice frequencies within which an impedance of said capacitor is significantly shunted by the resistances of said feed resistors.

2. A telephone line interface circuit as defined in claim 1 wherein the compensating means comprises:

tip and ring voltage dividers having tip and ring taps;

a differential amplifier having an input being connected across the tip and ring taps and an output being ac coupled to the compensating winding, the differential amplifier being operable in response to signals at the tip and ring taps to impede ac signals in the primary windings via the compensating winding; and a feedback network being connected in combination with the differential amplifier for limiting the impeding operation of the differential amplifier to said range of voice frequencies.

3. A method for coupling tip and ring leads of a telephone line with a telephone facility comprising the steps of:

impeding a battery source of current flow to and from the tip and ring leads via tip and ring primary windings of a transformer and corresponding tip and ring feed resistances being of similar predetermined values;

coupling alternating current between the tip and ring primary windings via a capacitance of predetermined value being connected therebetween; and driving alternating current via another winding of the transformer in current opposing relationship with differential alternating current in the telephone line and being in a range of voice frequencies at which impedance of said capacitance is significantly shunted by the tip and ring feed resistances and the battery source.

4. A telephone line interface circuit for coupling a telephone line and an associated telephone facility, comprising:

a transformer including tip and ring primary windings for connection between a source of energizing current and tip and ring leads of the telephone line;

tip and ring resistances being of similar ohmic values and being connected in series with the tip and ring primary windings;

a capacitor being connected in series between the junctions of the feed resistances and the corresponding tip and ring primary windings;

tip and ring taps in respective tip and ring voltage dividers being connected at said respective junctions;

a direct coupled amplifier circuit being responsive to direct current voltages at said tip and ring taps for regulating direct current flow, in a flux compensating winding in the transformer, in current opposing relationship to direct current flow in the tip and ring windings; and a capacitively coupled amplifier circuit being responsive to alternating current voltages at said tip and ring taps for regulating alternating current flow in a signal compensating winding in the transformer, in current opposing relationship to alternating current flow within a predetermined range of voice frequencies in the tip and ring windings.

5. A telephone line interface circuit as defined in claim 4 wherein the flux compensating winding and the signal compensating winding are one and the same compensate winding, and wherein the direct coupled amplifier circuit includes an output being direct current coupled via an emitter follower circuit to the compensating winding and wherein the capacitively coupled amplifier circuit includes an output being alternating current coupled via siad emitter follower circuit to the compensating winding.

6. A telephone line interface circuit as defined in claim 4 wherein the direct coupled amplifier circuit comprises:

a first differential amplifier having an input connected across the tip and ring taps, and an output;

a voltage following current source circuit having an output connected to control current flow in the compensating winding and an input;

a low pass filter being connected between the output of the first differential amplifier and the input of the voltage following current source circuit; and wherein the capacitively coupled amplifier circuit comprises:

a second differential amplifier having inverting and non-inverting inputs, and an output, the non-inverting input being connected to the output of the first differential amplifier;

a first resistive capacitive network being connected between the inverting input and the output of the second differential amplifier and to a terminal of the source of energizing current; and a second resistive capacitive network including a blocking capacitor being connected in series between the output of the second differential amplifier and a junction of the compensating winding and the output of the voltage following current source.

* * * * *